UNITED STATES PATENT OFFICE.

WILLIAM J. HAMMER, OF NEW YORK, N. Y.

ART OF MAKING PHOSPHORESCENT COLORS.

No. 12,812. Specification of Reissued Letters Patent. Reissued June 16, 1908.

Original No. 868,779, dated October 22, 1907, Serial No. 373,722. Application for reissue filed March 5, 1908. Serial No. 419,407.

*To all whom it may concern:*

Be it known that I, WILLIAM J. HAMMER, a citizen of the United States, residing in New York city, in the State of New York, have made certain new and useful Improvements in the Art of Making Phosphorescent Colors, of which the following is a specification.

Many attempts have been made to procure a variety of colors in luminescent paints like those heretofore prepared by the addition of calcium sulfid to various vehicles, such as linseed oil and other fluids which are used by painters to distribute the color evenly; the result of this or similar mixtures giving only a greenish blue, the effect of which is to impart a rather ghastly appearance to the articles to which the paint may be applied. Such attempts have heretofore been made by incorporating colors of different kinds with materials which are phosphorescent; these as a rule, and indeed so far as I am aware, have been entire failures, the characteristic color of the phosphorescent powder remaining unchanged and the colored substance serving only to weaken the phosphorescent effect, or in some cases to neutralize it altogether, even after prolonged stimulation. The most intense and vivid oil and water colors when mixed with calcium sulfid add no color under stimulation; their only effect seeming to be to lessen the response of the sulfid, producing different shades of the color characteristic of the calcium sulfid itself or of whatever phosphorescent material may be used.

I am aware that beautiful colors have been obtained by mixing various chemicals, minerals, etc., together, and subjecting them to varying degrees of heat for varying periods of time, but these processes are expensive, troublesome and unreliable; it being within my own knowledge that certain phosphorescent sulfids are sometimes made thirty times (apparently in exactly similar methods) before a successful result is secured; and the makers are wholly unable to determine why they do not obtain the desired result every time, or why they get it at all.

Calcium sulfid has usually been selected as the phosphorescent material because it is relatively cheap and because it is strongly excited and maintains its phosphorescence for a considerable time. It has therefore been the principal ingredient relied upon for making so-called "luminous paint". I have discovered, however, that it is possible (in spite of the repeated failures reported by others and which I have myself experienced) to obtain a large variety of colors in addition to the phosphorescent greenish blue, characteristic of that material, from calcium sulfid. I do not mean by this to limit my invention to this material, since I have used others capable of being excited so as to become luminescent; such for instance as phosphorescent sulfids of zinc, strontium, barium, etc.; and I find that by combining different materials under different conditions, I am enabled to procure a great many kinds and shades of colors; so many in fact, that it is quite possible to paint pictures which shall be luminescent in their proper characteristic colors.

Throughout this specification I have used the word "phosphorescent" to indicate substances which continue to glow in the dark after they have been stimulated by the various means used, such as sunlight, the mercury arc-light, etc., for a time after the source of the excitation is removed, calcium sulfid being a good example; while "fluorescent" materials, as the words are used in this specification, are those which respond actively to such stimulation only so long as they are within its influence, ceasing to glow when the source of excitation is removed, of which resorcin, especially resorcin blue, is an illustration.

To accomplish the purposes set out, I combine with the phosphorescent material, fluorescent liquids of various kinds and colors. I have been able to obtain a large variety of such fluorescent liquids, and in fact many kinds of colors, when mixed with suitable vehicles, are in themselves fluorescent. Excellent results, and results attained in no other way, can be secured by dissolving the fluorescent material in alcohol or ammonia, or other similar solvents, and then thoroughly mixing in the phosphorescent material. In this way each molecule or particle of the calcium sulfid, for example, is coated and impregnated or otherwise combined with the fluorescent material; when the resultant mixture is stimulated by the mercury arc or other means, it gives most brilliant colors, according to the fluorescent material used. Some of the materials which I have used are the various forms of coal-tar colors which have a known fluorescent effect, such as those which are used in photography to make the ordinary dry-plate orthochromatic. As examples of such colors, I may name the dyes eosin, resorcin, rhodamin, fuchsin, naphthalin, all of which produce, when dissolved in a suitable vehicle, distinct fluorescent effects.

By changing the amount of dye used, I am able to get different shades of the resultant color. The results are not always, and in fact not generally, like the colors either of the fluorescent material or of the phosphorescent substance which is mixed with it and which forms the main basis of the luminescence when excited. The new art which I believe myself to have discovered resembles in its practical applications the art of china painting, in which, the artist uses colors of most incongruous appearances, which are entirely changed by the process of firing; so in this art, the materials are to be selected which will give the colors desired by the artist.

As practical examples of the application of my invention I mention that eosin, triturated and dissolved in an appropriate vehicle, and then mixed with calcium sulfid, causes a pink luminescence entirely different from that of the calcium salt. A preferred way is to triturate the eosin and dissolve it in the vehicle, and then to mix with the latter the powdered calcium sulfid, with precautions hereafter described, thoroughly incorporating them into a smooth paint capable of application with a brush or otherwise.

I will now name some of the colors which I have been able to produce and the means by which their production has been accomplished; the enumeration of such colors is not, however, to be taken to mean that these are the only ones which I have used or which I aim to cover by this specification, since it is obvious that to name them all would be simply to make a catalogue.

To obtain colors in the red end of the spectrum I employ as a fluorescent, rhodamin, thus obtaining the most brilliant scarlets, reds and magentas; the rhodamin may be dissolved in alcohol or ammonia and then ground or otherwise thoroughly incorporated with calcium sulfid or other phosphorescent material, after which the resulting mixture may be mixed with a varnish or other drying oil. The tint produced will depend upon the amount of the fluorescent coloring matter employed. I have also produced a white phosphorescence, practically free from trace of the usual greenish-blue, and which is, so far as I am aware, the first production of this effect. This is obtained by combining a mixture of phosphorescent zinc and calcium sulfids with alcohol, or with a trace of tincture of stramonium or uranin in alcohol, and making a paint with oil as hereafter described. Another means of producing a white phosphorescence, although not quite so good as the one just described, is by dissolving uranin in alcohol and mixing in the way already indicated, with calcium sulfid.

A fine yellow or orangt color in different shades may be produced by combination of uranin, dissolved, with zinc sulfid.

The blues may be produced from resorcin, with calcium or zinc sulfids, resorcin blue being one of the most fluorescent substances with which I am acquainted; very intense blues may be produced by relatively small amounts of the dye.

Many desirable colors may be compounded of the fundamentals herein described, and the precise tints may be as infinitely or indefinitely varied as in the color-maker's art, by compounding with the phosphorescent material two or more liquids containing fluorescent substances which respond in different wave-lengths to stimulation.

The colors thus produced are capable of practically indefinite preservation. In certain of my early experiments I have obtained luminescence under excitation, or luminescence after stimulation so long as the luminescent substance was kept moist, but the phosphorescence dies out with the evaporation of the fluorescent liquid; my subsequent results, however, are permanent so far as I know. When the colors are merely dissolved in alcohol or ammonia, they are very vivid, but either get dull or die out when dry. I have also found that calcium sulfid soon loses its phosphorescent qualities when mixed with water only. But this quality is real, and when such liquids as alcohol, ammonia and naphtha are employed, as already pointed out, permanence is obtained by adding a viscous preservative, such as the various varnish gums in solution; for example, magilp, dammar, tragacanth, arabic, Canada balsam; and the various drying oils may be also employed, of which linseed oil is a type. When desired, perfumes such as oil of cloves or cinnamon may be added. Many of the compositions which I have used I have coated upon glass and other substances and baked in an oven, or by electric heat, until it is fused on like enamel, so that it can be no longer removed with the finger-nail or even with a knife; in this condition the substances are obviously absolutely desiccated, yet they preserve their luminescent properties when properly stimulated.

Many means of exciting radiation are well known to workers in this art. Sunlight acts very strongly. The ordinary carbon arc-light acts to a certain extent, but not so strongly as the sun; an arc generated between iron or magnetite electrodes may be used with excellent effect. The best practical means of stimulation with which I am acquainted, however, is the now well-known and commercial mercury arc-light, the effect of which is very marked and quite enduring. The quartz-tube mercury-arc lamp is particularly applicable by reason of the quartz allowing a large portion of the ultra-violet and other short waves of great stimulative power to pass, whereas these are largely cut off by a glass tube. Proper precautions must of course be taken in using this highly dangerous form of mercury arc. Ultra-violet light, preferably produced by iron electrodes in the secondary circuit of an induction coil, the gap being shunted by a condenser, is excellent. Radium, with which I have experimented extensively, though so far too expensive for general use, is also a good stimulant. I have made mixtures of radium preparations with phosphorescent materials such as sulfid of zinc, wilemite, etc., which still glow in the dark, after having been prepared for five years.

In the practical application of my discovery, resort may be had to any of the usual and convenient means of application now in common use without departing from the invention, and necessarily the skill of those in the various mechanic arts will be brought into play to select the proper method for the particular work in hand. If the article be of metal or glass, some of the forms of enamel which I have indicated above may be preferred, since they are, so far as I know, moisture-proof and highly resistant both to weather and the action of the elements. In other applications, the common methods of treating pigment may be employed; while cloth may be soaked with the fluid pigment or may have the dry substance applied to it and have it subsequently there fixed by the application of the fluorescent liquid. The colors derived may as above indicated be used in the direct production of pictorial effect. They may be applied to draperies, or to modeling clay, also they may be applied to any desired surface, phosphorescent material being first incorporated therewith in any way desired, after which it is rendered active by the fluorescent material and preserved with a coat of varnish, which may be omitted of these I aim to cover by the claims. Pic- where great permanence is not needed. All tures painted with the colors which I have described possess under excitation an intensity and life entirely wanting where opaque colors, dependent only upon reflected light, are employed. These pictures are independent of the external light, since the colors described act as wave-changers and emit their characteristic wave-lengths even when those waves are wholly wanting in the spectrum of the external light source.

Although I have specified phosphorescent calcium sulfid and zinc sulfid more especially as the phosphorescent materials to be employed, I do not mean to exclude others, of which a number are known, calcium tungstate being one which I have employed. I have named the others because they were cheap and easily secured and because I have employed them so extensively in my experiments, but I believe the principles of my invention to be applicable to a large number of substances which may be rendered fluorescent in colors, according to the methods outlined herein.

Having thus described my invention, what I claim and wish to protect by Letters-Patent of the United States is:

1. The new art of obtaining varying colors in phosphorescent materials, which consists in mixing a material which is phosphorescent under stimulation with a vehicle rendered fluorescent.

2. The new art of obtaining various shades of different colors in the phosphorescent materials, which consists in mixing material capable of phosphorescence under stimulation with liquids containing various amounts of fluorescent coloring matters.

3. The art of producing brilliant phosphorescent colors in the red end of the spectrum, which consists in combining a phosphorescent sulfid with rhodamin, dissolved or mixed with a suitable liquid, such as alcohol or ammonia, and stimulating the resultant combination.

4. The art of producing brilliant phosphorescent colors in the red end of the spectrum, which consists in combining a phosphorescent sulfid with rhodamin, dissolved or mixed with a suitable liquid, such as alcohol or ammonia, adding a viscous preservative, such as a varnish gum, and stimulating the resultant combination.

5. The new art of obtaining various colors in phosphorescent materials, which consists in mixing a material which is phosphorescent under stimulation, with a fluorescent color dissolved in alcohol, and adding a viscous preservative.

6. The new art of obtaining various shades of colors in phosphorescent materials, which consists in mixing material capable of phosphorescence under stimulation with liquids containing fluorescent coloring matter and adding a viscous preservative, such as a varnish gum.

7. The art of producing brilliant phosphorescent colors in the red end of the spectrum, which consists in combining a phosphorescent sulfid with rhodamin dissolved in alcohol, adding a viscous preservative, such as varnish gum, and stimulating the resultant combination.

8. The art of producing phosphorescent colors, which consists of compounding with phosphorescent material two or more liquids containing fluorescent substances which respond in different wave-lengths to stimulation 9. The new composition of matter which consists of a mixture of a material phosphorescent under stimulation, with a vehicle rendered fluorescent.

10. The new composition of matter which consists of a phosphorescent sulfid, combined with rhodamin dissolved in a suitable liquid, such as alcohol or ammonia.

11. The new colored luminous paint, which consists of a mixture of a material phosphorescent under stimulation, with fluorescent color dissolved in a vehicle and a viscous preservative.

12. The new composition of matter which consists of a phosphorescent sulfid, combined with rhodamin dissolved or mixed with a suitable liquid such as alcohol or ammonia, and a viscous preservative, such as a varnish gum.

13. The new composition of matter which consists of a mixture of a material phosphorescent under stimulation, with fluorescent color dissolved in alcohol, and a viscous preservative, such as a varnish gum.

14. The new colored luminous paint, which consists of a mixture of phosphorescent zinc sulfid with fluorescent color dissolved in a suitable vehicle.

15. The new colored luminous paint, which consists of a mixture of phosphorescent zinc sulfid, a fluorescent color dissolved in a suitable vehicle, and a viscous preservative, such as a varnish gum.

16. The new composition of matter which consists of phosphorescent material mixed with a liquid containing two or more fluorescent substances which respond in different wave-lengths to stimulation.

17. The new composition of matter which consists of phosphorescent material mixed with a liquid containing two or more fluorescent substances which respond in different wave-lengths to stimulation, and a viscous preservative, such as a varnish gum.

18. The new composition of matter, which consists of a base of phosphorescent material combined with fluorescent material responding to stimulation with light of wave-lengths different from that of the characteristic response of the phosphorescent base.

In witness whereof, I have hereunto set my name in the presence of two witnesses.

WILLIAM J. HAMMER.

Witnesses:

T. J. JOHNSTON,

IRVING OBRIEGHT.